United States Patent [19]

Shyu

[11] Patent Number: 5,298,213
[45] Date of Patent: Mar. 29, 1994

[54] METHOD OF MAKING A CERAMIC BURNER HEAD

[75] Inventor: Wan-Tsai Shyu, Nan-Tou Hsien, Taiwan

[73] Assignee: Yan-Fei Ju, Taichung Hsien, Taiwan

[21] Appl. No.: 57,155

[22] Filed: May 5, 1993

[30] Foreign Application Priority Data

Jan. 13, 1993 [TW] Taiwan ............................... 82100/88

[51] Int. Cl.$^5$ .............................................. C04B 33/28
[52] U.S. Cl. ........................................ 264/62; 264/67; 264/86; 264/220; 264/225; 264/226; 264/227
[58] Field of Search ...................... 264/62, 67, 86, 220, 264/225, 226, 227

[56] References Cited

U.S. PATENT DOCUMENTS

| | | | |
|---|---|---|---|
| 5,013,500 | 5/1991 | Hamanaka | 264/67 |
| 5,013,501 | 5/1991 | Fukao | 264/67 |
| 5,169,578 | 12/1992 | Fukao | 264/86 |

FOREIGN PATENT DOCUMENTS 1323822  7/1973  United Kingdom ................. 264/86

*Primary Examiner*—James Derrington
*Attorney, Agent, or Firm*—Christie, Parker & Hale

[57] ABSTRACT

A method of making a ceramic burner head includes the steps of forming a positive mold that conforms to the shape of a burner head and providing a partition plate to the positive mold; forming a negative plaster mold by the use of the positive mold; introducing a ceramic slurry into a mold cavity of the negative mold; causing the ceramic slurry in contact with a surrounding wall that confines the mold cavity of the negative plaster mold to possess a layer of dried ceramic with a predetermined thickness, and to further possess a hollow portion that is confined by the layer of dried ceramic and that is filled with a non-dried ceramic; removing the negative plaster mold and providing the layer of dried ceramic with burner holes; and sintering the layer of dried ceramic to form the ceramic burner head.

2 Claims, 7 Drawing Sheets

5,298,213

METHOD OF MAKING A CERAMIC BURNER HEAD

BACKGROUND OF THE INVENTION

1. Field of Invention

The invention relates to a method of making a gas burner head, more particularly to a method of making a ceramic gas burner head.

2. Description of the Related Field

A conventional method of making a gas burner head includes the following steps: (1) press forming two metal pieces; (2) welding the peripheries of the metal pieces together so that the metal pieces cooperatively form a metal burner head precursor; and (3) boring a plurality of burner holes through a wall of the metal burner head precursor, thereby obtaining a metal gas burner head.

One of the drawbacks of the conventional method of making a gas burner head is that the weld left on an external surface of the metal burner head must be filed in order to obtain a smooth surface. In addition, the burner holes at the top side of the gas burner head are susceptible to clogging due to rust or to liquid or other materials which fall from a cooker on the burner head or due to the accumulation of carbon at the burner holes. Metals are not chemical and corrosion resistant and thus, rust-corrosion and clogging often decrease the intensity of the flame produced at the burner holes and can consequently shorten the useful life of the conventional metal gas burner head. Rapid heating and cooling can also lead to shortening of the useful life of the conventional metal gas burner head.

SUMMARY OF THE INVENTION

The main objective of the present invention is to provide a method of making a ceramic gas burner head so that the user of the ceramic burner head does not encounter the above-stated drawbacks.

According to the present invention, the method of making a ceramic gas burner head includes the following steps (1) forming a positive mold that conforms to the outline of a burner head and forming a partition plate around the positive mold in order to divide the positive mold into an upper section and a lower section; (2) forming a negative plaster mold which is wrapped around the positive mold and which is divided into two mold pieces by the partition plate, each of the mold pieces having a first mold cavity conforming respectively to the outlines of the upper and lower sections of the positive mold, and which defining cooperatively a surrounding wall that confines a second mold cavity that conforms to the outline of the burner head, one of the mold pieces having a channel which communicates the second mold cavity of the negative plaster mold to an exterior of the same; (3) introducing a ceramic slurry into the second mold cavity of the negative plaster mold via the channel; (4) allowing the ceramic slurry to contact the surrounding wall of the negative plaster mold in order to form a layer of dried ceramic with a predetermined thickness and a hollow portion which is confined by the layer of the dried ceramic, the hollow portion being filled with a non-dried ceramic slurry; (5) pouring the non-dried ceramic slurry out of the hollow portion via the channel and out of the negative plaster mold to empty the hollow portion; (6) removing the layer of dried ceramic from the negative plaster mold and providing the layer of dried ceramic with burner holes; and (7) sintering the layer of dried ceramic to form a ceramic burner head.

The ceramic burner head is chemical resistant so that rust and corrosion is prevented, thereby preventing clogging of the burner holes. Since quick heating and cooling does not affect ceramic materials, a relatively long useful life can be attained.

BRIEF DESCRIPTION OF THE DRAWINGS

Other features and advantages of the method of making a ceramic burner head according to the present invention will become more apparent in the following detailed description of the preferred embodiments with reference to the accompanying drawings, in which.

DETAILED DESCRIPTION OF THE PREFERRED EMBODIMENT

Figure 1:
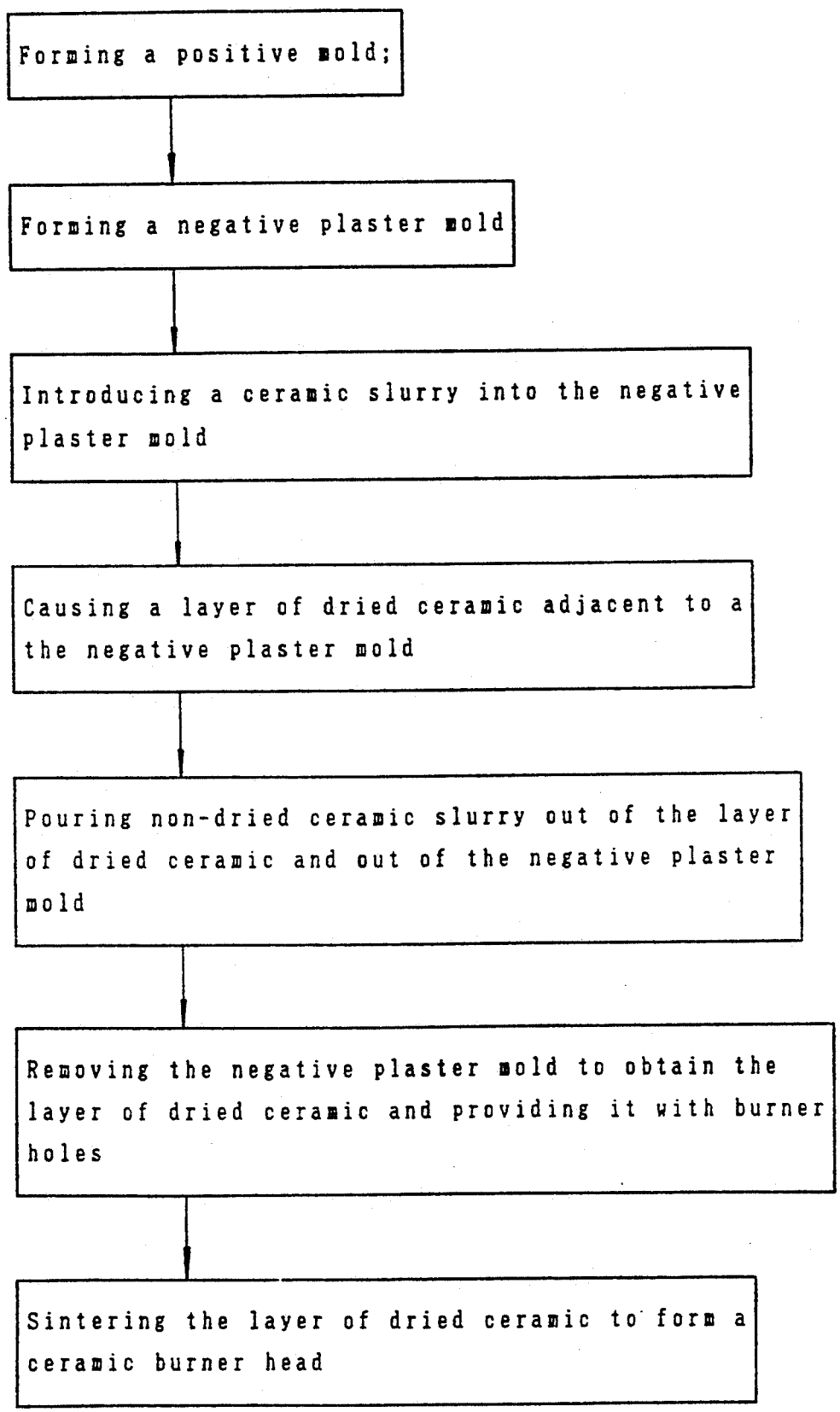
FIG. 1 is a block diagram that shows the steps of making a ceramic gas burner head according to a method of the present invention.

FIG. 1 is a block diagram that shows the steps of making a ceramic gas burner head according to the present invention.

Figure 2:
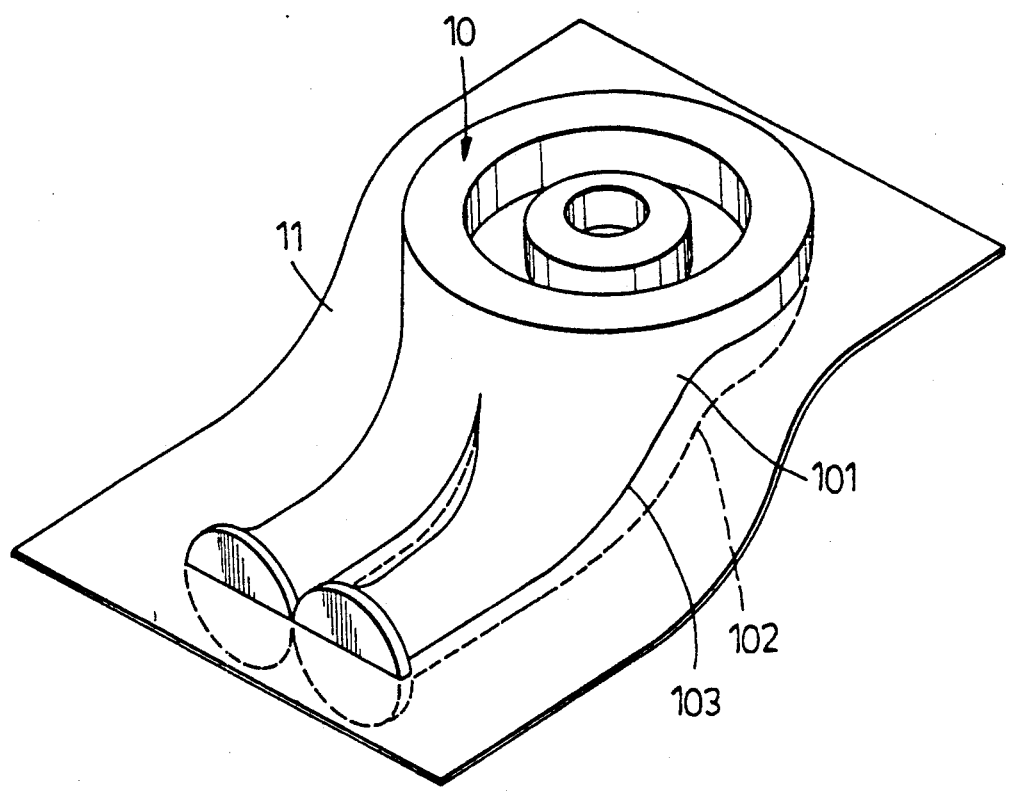
FIG. 2 shows a positive mold that conforms to a burner head and that is used to produce a ceramic burner head according to the method of the present invention.
Figure 3:
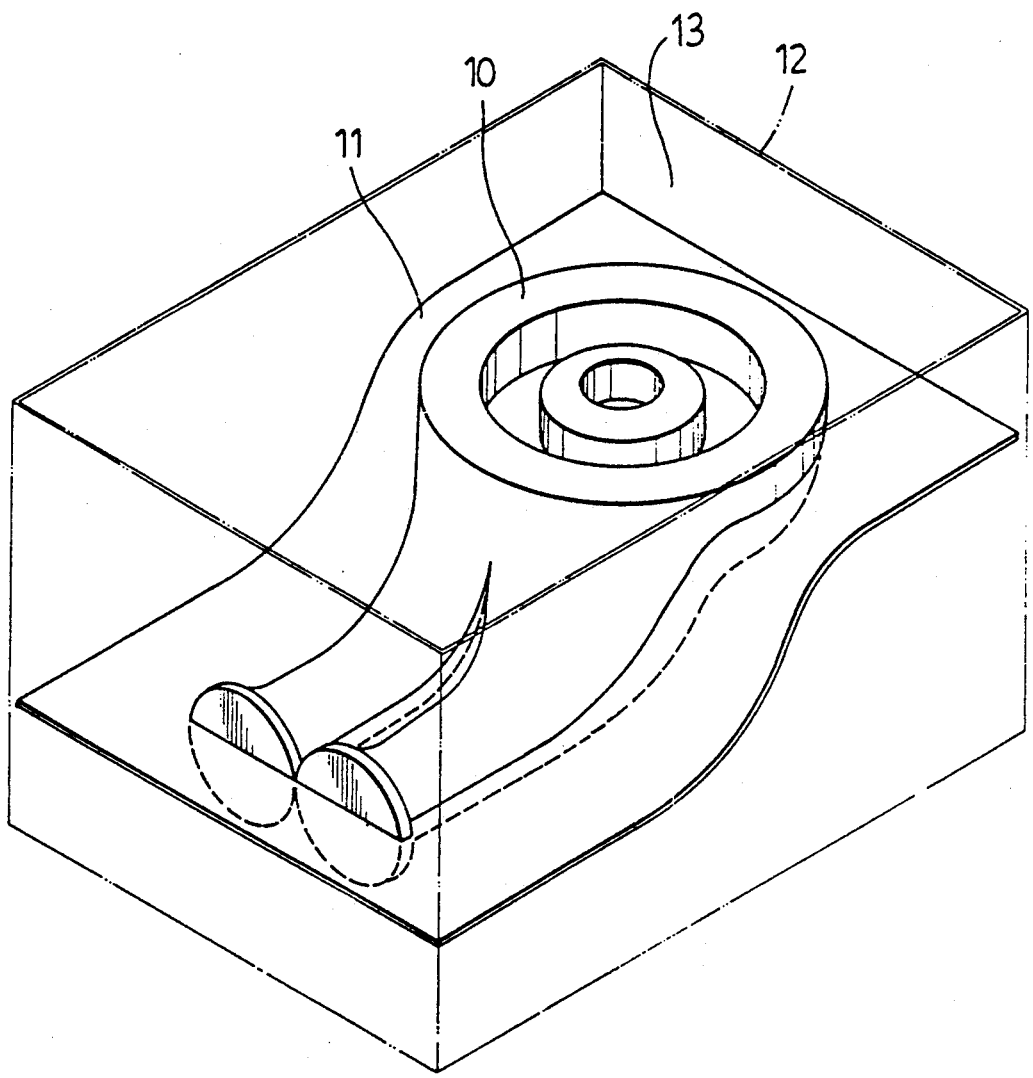
FIG. 3 shows the positive mold of FIG. 2 being provided in a casing to form a negative plaster mold for making the ceramic burner head according to the method of the present invention.

The method accordingly includes the following steps:

(1) a positive mold (10) is formed by a known suitable method. As best illustrated in FIG. 2, the positive mold (10) has a shape that conforms to the ceramic burner head which is to be produced according to the method of the present invention. The positive mold (10) is provided with, a partition plate (11) which divides the same at 103 into an upper section (101) and a lower section (102).

Figure 4:
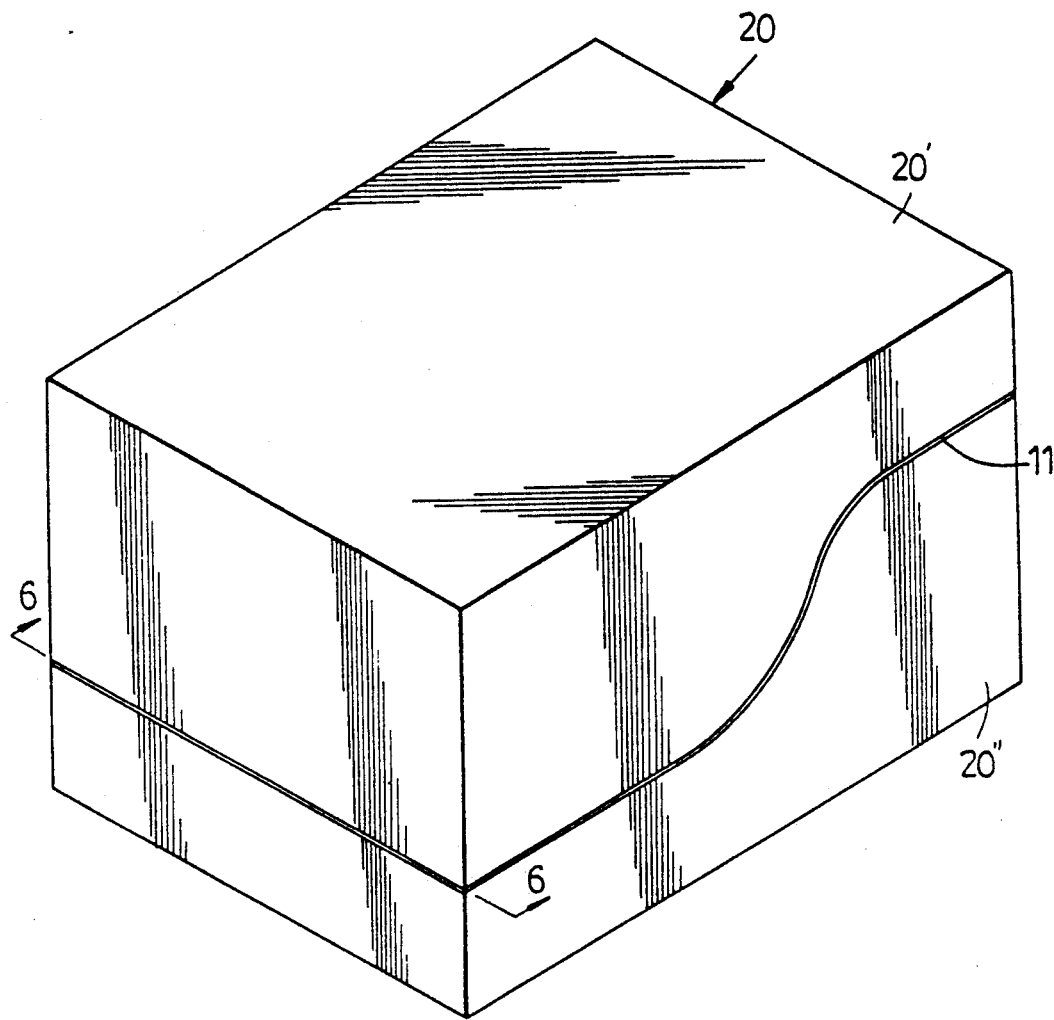
FIG. 4 shows a perspective view of the negative plaster mold for making the ceramic burner head according to the method of the present invention.
Figure 5:
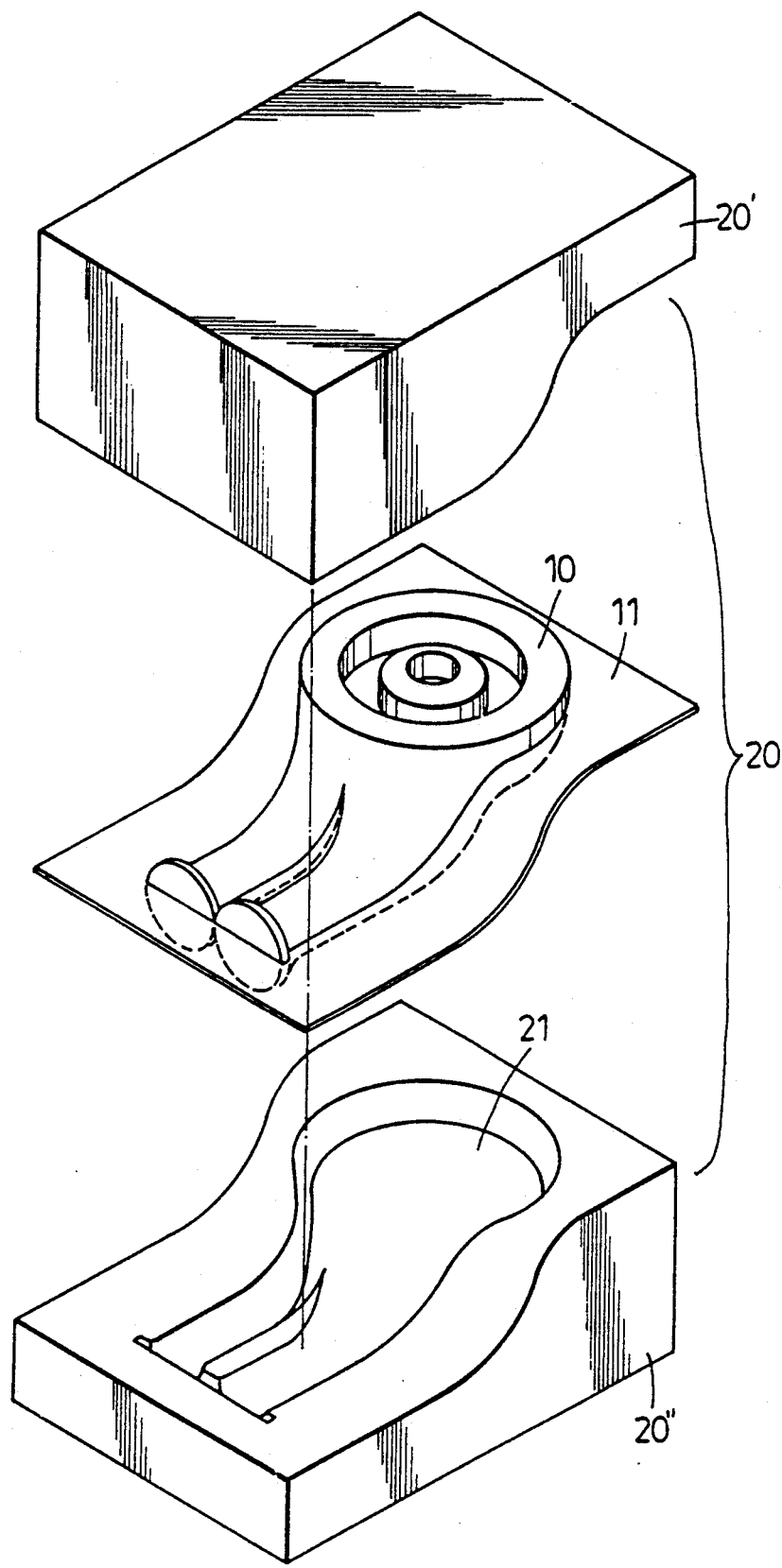
FIG. 5 shows two mold pieces of the negative plaster mold shown in FIG. 4 and the positive mold for making the ceramic burner head according to the method of the present invention.
Figure 6:
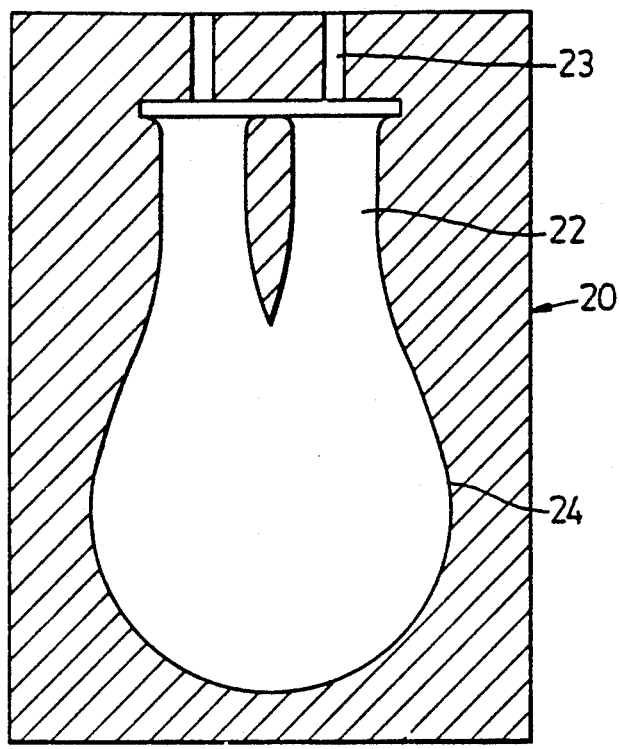
FIG. 6 is a cross sectional view of the negative plaster mold that is used to produce the ceramic burner head according to the method of the present invention.

(2) The positive mold (10) is placed in a box (12) which confines a receiving space (13) therein. The partition plate (11) of the positive mold (10) divides the box (12) into an upper section and a lower section. Plaster is cast into the box (12) with high pressure. When the plaster is sufficiently hard, a negative plaster mold (20) is obtained by removing the positive mold (10) therefrom, as illustrated in FIGS. 4 and 5. The negative plaster mold (20) includes first and second mold pieces (20', 20"). Each of the first and second mold pieces (20', 20″) has a first mold cavity (21) such that when the first and second mold pieces (20′, 20″) are clamped together, the first mold cavities (21) of the first and second mold pieces (20′, 20″) cooperate to define a second mold cavity (22) and a surrounding wall (24) which confines the second mold cavity (22), as best illustrated in FIG. 6. A channel (23) is bored through one of the mold pieces (20′, 20″) to communicate the second mold cavity (22) of the negative plaster mold (20) to an exterior of the same.

Figure 7:
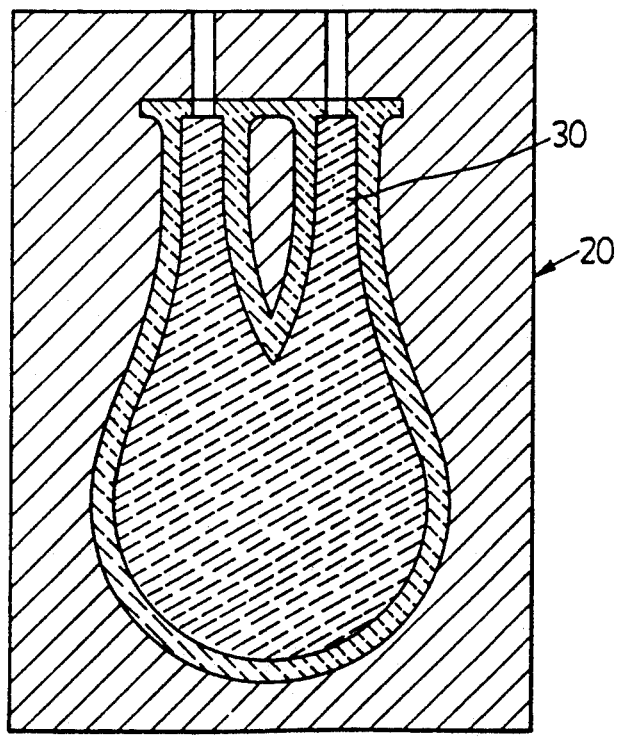
FIG. 7 illustrates how the cavity of the negative plaster mold of FIG. 4 is filled with a ceramic slurry according to the method of the present invention.

(3) Predetermined amount of ceramic clays, such as Dolomite clay, Ball clay including $SiO_3$ 45–49%, $Al_2O_3$ 32–38%, $Fe_2O_3$ 1–2%, $H_2O$ 10–16% and water are mixed properly with an appropriate amount of water in order to form a ceramic slurry (30). In the present invention, the Dolomite clay, the Ball clay and water has a weight of 1:1:2. The ceramic slurry (30) is sifted so as to remove undesirable particles therefrom. The ceramic slurry (30) is poured into the second mold cavity (22) of the negative plaster mold (20) via the channel (23), as shown in FIG. 7. The ceramic slurry (30) is kept within the second mold cavity (22) for a 20–30 minutes, during which the surrounding wall (24) of the negative plaster mold (20) absorbs water from the ceramic slurry (30) which is in contact with the surrounding wall (24) so that a layer of dried ceramic with a predetermined thickness is formed adjacent to the surrounding wall (24) with a hollow portion which is confined by the layer of dried ceramic. At this stage, the hollow portion is filled with a non-dried ceramic slurry.

(5) The non-dried ceramic slurry (30) is poured out of the hollow portion via the channel (23) and out of the negative plaster mold (20) so as to empty the hollow portion.

(6) The negative plaster mold (20) is removed from the layer of dried ceramic and a plurality of burner holes (41, 42) with predetermined patterns are bored through the layer of dried ceramic so as to obtained a ceramic burner head precursor.

Figure 8:
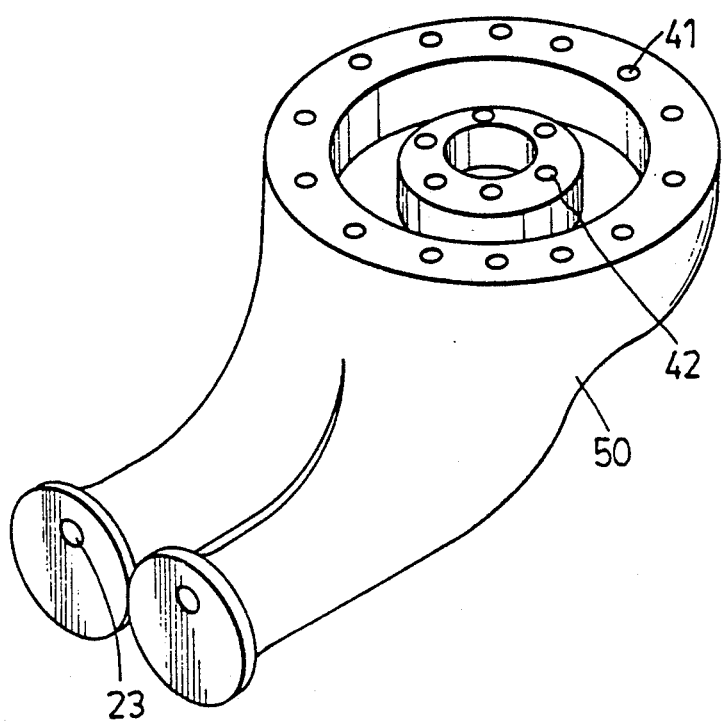
FIG. 8 shows a perspective view of the ceramic burner head produced according to the method of the present invention.

(7) An external surface of the ceramic burner head precursor (50), as shown in FIG. 8, is finished to yield a high quality appearance. Varnish, in the form of pictures, is applied on the external surface of the ceramic burner head precursor (50). The ceramic burner head precursor (50) is treated by a reduction sintering method with a temperature ranging between 800° C. to 900° C. for a period of time. The temperature is then raised gradually to 1200° C. or 1400° C. during which some chemical reaction take place. It is best to treat the ceramic burner head precursor (50) for 12 to 14 hours. During the heat treatment, the water in the ceramic burner head precursor (50) evaporates, and mixed silicates in the varnish decompose and generate carbon dioxide. Thus, a water impermeable transparent layer is coated on the external surface of the ceramic burner head precursor (50) so that in the event that water is spilled accidentally on the ceramic burner head during cooking, rust-corrosion does not occur at the burner holes (41, 42). Therefore, clogging at the burner holes (41, 42) of the ceramic burner head is eliminated.

When a gas tank is connected to a free end of the channel (23) of the ceramic burner head, an interior of the ceramic burner head is communicated with an exterior of the same through the burner holes (41, 42).

A retaining hole (not shown) can be formed at a lower section of the ceramic burner head precursor (50) during manufacturing. When mounting the ceramic burner head on a burner frame, a locking bolt (not shown) can be inserted through the retaining hole in the ceramic burner head so as to fasten the latter on the burner frame.

Some advantages that result with the use of the ceramic burner head which is produced according to the method of the present invention are as follows:

(1) Since the ceramic gas burner head is acid-resistant, rust corrosion resistant and anti-oxidation, the useful life therefore is longer than that of a metal burner head.

(2) Expansion and contraction of the ceramic burner head due to heat does not affect ceramic materials and thus, untimely ruin of the ceramic gas burner head can be avoided.

While a preferred embodiment has been explained and described, it will be apparent that many changes and modifications can be made in the general construction and arrangement of the present invention without departing from the scope and spirit thereof. Therefore, it is desired that the present invention be not limited to the exact disclosure but only to the extent of the appended claims.

I claim:

1. A method of making a ceramic burner head comprising the steps of:
   (1) forming a positive mold that conforms to the outline of a burner head and forming a partition plate around said positive mold so as to divide said positive mold into an upper section and a lower section;
   (2) forming a negative plaster mold which is wrapped around said positive mold and which is divided into two mold pieces by said partition plate, each of said mold pieces having a first mold cavity, said first mold cavities conforming respectively to the outlines of said upper and lower sections of the positive mold and forming cooperatively a second mold cavity with a surrounding wall confining said second mold cavity and which conforms to the outline of said burner head, one of said mold pieces having a channel which communicates said second mold cavity of said negative plaster mold to an exterior of the same;
   (3) introducing a ceramic slurry into said second mold cavity of said negative plaster mold via said channel;
   (4) allowing said ceramic slurry to contact said surrounding wall of said negative plaster mold in order to form a layer of dried ceramic with a predetermined thickness adjacent to said surrounding wall of said negative plaster mold and a hollow portion which is confined by said layer of dried ceramic, said hollow portion being filled with a non-dried ceramic slurry;
   (5) pouring said non-dried ceramic slurry out of said hollow portion via said channel and out of said negative plaster mold to empty said hollow portion;
   (6) removing said layer of dried ceramic from said negative plaster mold and providing said layer of dried ceramic with burner holes; and
   (7) sintering said layer of dried ceramic to form a ceramic burner head.

2. The method according to claim 1, wherein said layer of dried ceramic is coated with a varnish before the step (7) so as to form a gloss surface on said ceramic burner head.

* * * * *

UNITED STATES PATENT AND TRADEMARK OFFICE
CERTIFICATE OF CORRECTION

PATENT NO. : 5,298,213
DATED : March 29, 1994
INVENTOR(S) : Wan-Tsai Shyu

It is certified that error appears in the above-indentified patent and that said Letters Patent is hereby corrected as shown below:

Column 3, line 12, change "SiO$_3$45-49%" to
-- SiO$_3$ 45-49% --.

Column 3, line 22, before "20-30" delete "a".

Column 3, line 38, change "obtained" to -- obtain --.

Signed and Sealed this

Thirty-first Day of January, 1995

*Attest:*

BRUCE LEHMAN

*Attesting Officer*     *Commissioner of Patents and Trademarks*